(12) United States Patent
Wu et al.

(10) Patent No.: US 11,209,069 B1
(45) Date of Patent: Dec. 28, 2021

(54) DYNAMIC BALANCING APPARATUS

(71) Applicant: NATIONAL CENTRAL UNIVERSITY, Taoyuan (TW)

(72) Inventors: Yu-Ren Wu, Taoyuan (TW); Yun-Chi Chung, Taoyuan (TW)

(73) Assignee: NATIONAL CENTRAL UNIVERSITY, Taoyuan (TW)

( * ) Notice: Subject to any disclaimer, the term of this patent is extended or adjusted under 35 U.S.C. 154(b) by 0 days.

(21) Appl. No.: 17/085,973

(22) Filed: Oct. 30, 2020

(30) Foreign Application Priority Data

Jun. 3, 2020 (TW) .................................. 109118709

(51) Int. Cl.
*F16F 15/14* (2006.01)
*F16F 15/28* (2006.01)

(52) U.S. Cl.
CPC ............ *F16F 15/145* (2013.01); *F16F 15/28* (2013.01); *F16F 2222/08* (2013.01); *F16F 2230/0011* (2013.01); *F16F 2232/02* (2013.01)

(58) Field of Classification Search
CPC .......... F16F 15/14; F16F 15/145; F16F 15/28; F16F 15/286; F16F 2222/08; F16F 2230/0011; F16F 2230/06; F16F 2232/02; F16H 53/02; F16H 53/025
See application file for complete search history.

(56) References Cited

U.S. PATENT DOCUMENTS

| | | | |
|---|---|---|---|
| 5,195,229 A * | 3/1993 | Hughes | F16H 53/025 29/252 |
| 7,004,294 B2 * | 2/2006 | Williams | F16F 15/145 188/378 |
| 7,284,460 B2 * | 10/2007 | Yamamoto | B23B 31/00 279/103 |

(Continued)

FOREIGN PATENT DOCUMENTS

| | | |
|---|---|---|
| CN | 102422195 A | 4/2012 |
| CN | 109611495 A | 4/2019 |

(Continued)

OTHER PUBLICATIONS

Machine translation of WO 2010/117069 A1 obtained on Jan. 25, 2021.*

*Primary Examiner* — Adam D Rogers
(74) *Attorney, Agent, or Firm* — Sinorica, LLC

(57) ABSTRACT

A dynamic balancing apparatus includes a dynamic balancing assembly and a plurality of damping particles. The dynamic balancing assembly includes at least two structural members separately arranged on a rotating shaft connected to a rotor, wherein each structural member includes at least one recess portion. The plurality of damping particles are introduced into at least one recess portion of each structural member, such that a centroid of each structural member deviates from the axis. Accordingly, each structural member generates inertial force and moment of inertia as rotation of the rotor to offset another inertial force and moment of inertia generated by centroid deviation of the rotor while (Continued)

rotating to achieve dynamic balance. The plurality of damping particles can move in the recess portion as rotation of the rotor to induce friction and collision so as to achieve the effects of vibration reduction and noise reduction.

10 Claims, 7 Drawing Sheets

(56) References Cited

U.S. PATENT DOCUMENTS

| | | | | |
|---|---|---|---|---|
| 8,881,622 | B2 * | 11/2014 | Maienschein | F16F 15/145 |
| | | | | 74/574.2 |
| 9,855,610 | B2 * | 1/2018 | Frank | B23C 5/003 |
| 10,443,684 | B2 * | 10/2019 | Chern | F16F 7/015 |
| 10,473,185 | B2 * | 11/2019 | Zouani | F16H 55/17 |
| 2010/0175956 | A1 * | 7/2010 | Zadoks | F16F 15/173 |
| | | | | 188/268 |

FOREIGN PATENT DOCUMENTS

| | | | | | |
|---|---|---|---|---|---|
| EP | | 3428477 | A1 * | 1/2019 | F16F 9/46 |
| FR | | 1263677 | A * | 6/1961 | F01D 5/22 |
| JP | | 10306851 | A * | 11/1998 | |
| WO | WO-2010117069 | A1 * | 10/2010 | F16F 15/03 |
| WO | WO-2017021079 | A1 * | 2/2017 | F16F 9/43 |

* cited by examiner

DYNAMIC BALANCING APPARATUS

FIELD OF THE INVENTION

The present disclosure relates to a technical field of dynamic balancing apparatus, particularly, to a dynamic balancing apparatus combinable to a device having a rotor.

BACKGROUND OF THE INVENTION

Commonly, an electrical device (such as a rotor, a compressor, etc.) performs power output or mechanical transmission by means of continuous rotating of a rotor. Generally speaking, the centroid of the rotor needs to be kept on a fixed axis of the rotor such that the rotor rotating about a fixed axis maintains rotating balance. However, a rotor may, due to factors such as its structural defect or deformation, structural assembly deviation or uneven load, etc., cause the centroid of the rotor to deviate from its original fixed axis. Once the aforementioned rotor begins to rotate, the rotor tends to experience rotating imbalance due to additional centrifugal inertial force and moment of inertia caused by deviation of the centroid. Moreover, the rotating efficiency and quality of the rotor will be reduced by vibration and noise generated from the rotating imbalance.

SUMMARY OF THE INVENTION

The objective of the present disclosure is to provide a dynamic balancing apparatus combinable to a device having a rotor to improve dynamic balancing of the rotor while rotating.

In order to achieve the aforesaid objectives among others, the dynamic balancing apparatus of the present disclosure is applicable to a device having a rotor where two ends of the rotor are connected a rotating shaft extending along an axis. The dynamic balancing apparatus of the present disclosure includes a dynamic balancing assembly and a plurality of damping particles. The dynamic balancing assembly includes at least two structural members separately arranged on the rotating shaft connected to the rotor so as to rotate simultaneously with the rotor, and each of the structural members corresponds to an independent plane perpendicular to the axis of the rotating shaft, wherein each of the structural members includes at least one recess portion. The plurality of damping particles are introduced into at least one recess portion of each of the structural members, such that a centroid of each of the structural members deviates from the axis. Accordingly, each of the structural members generates an inertial force and moment of inertia as rotation of the rotor to offset another inertial force and moment of inertia generated by centroid deviation of the rotor while rotating to achieve dynamic balance. The plurality of damping particles can move in the recess portion as rotation of the rotor to induce friction and collision so as to achieve the effects of vibration reduction and noise reduction.

In an embodiment of the present disclosure, when the at least one recess portion of the structural member is plural, the recess portions are arranged symmetrically in structure about the axis.

In an embodiment of the present disclosure, the plurality of damping particles are introduced into at least one of the recess portions of the structural member.

In an embodiment of the present disclosure, when the recess portion of the structural member introduced with a plurality of damping particles is plural, the total mass of the plurality of the damping particles in the recess portions are not all the same.

In an embodiment of the present disclosure, the damping particle is made of plastic material.

In an embodiment of the present disclosure, the damping particle is of hollow particle structure.

In an embodiment of the present disclosure, the plurality of damping particles may simultaneously have various sizes or shapes.

In an embodiment of the present disclosure, the inertial force generated by any of the structural members is equal to a total inertial force generated by all of the recess portions introduced with a plurality of damping particles of the structural member.

In an embodiment of the present disclosure, the inertial force generated by any of the recess portions is equal to the product of the total mass of the plurality of damping particles introduced into the recess portion, the square of the angular velocity of the rotating rotor, and the shortest distance from the axis to the location of the centroid of volume of the plurality of damping particles introduced into the recess portion when the structural member rotates with the rotor.

In an embodiment of the present disclosure, the independent plane corresponding to any of the structural members is substantially parallel to an independent plane corresponding to another of the structural members.

Accordingly, the dynamic balancing apparatus of the present disclosure can, pursuant to the status of centroid deviation of a rotor, and by means of introducing multiple damping particles of required mass into one or more recess portions corresponding to each structural member, cause centroid deviation on each structural member to achieve dynamic balancing while the rotor rotates. Moreover, reduction of vibration and noise can be achieved by the friction and collision induced from the movement of the plurality of the damping particles as the rotor rotates.

The present disclosure further includes a method applicable to a device having a rotor for maintaining dynamic balancing and reducing vibration. The method includes the following steps: calculating an inertial force and moment of inertia generated due to centroid deviation of a rotor while rotating; separately disposing at least two structural members on a rotating shaft connected to the rotor, wherein each of the structural members corresponds to an independent plane perpendicular to an axis of the rotating shaft, and each of the structural members includes at least one recess portion; and introducing a plurality of damping particles into at least one recess portion of each of the structural members so as to cause the centroid of each of the structural members to deviate from the axis. Accordingly, each of the structural members generates inertial force and moment of inertia with the rotation of the rotor to offset the inertial force and the moment of inertia generated from the centroid deviation of the rotor while rotating to achieve dynamic balancing, wherein the plurality of damping particles can move within the recess portion while the rotor rotates to induce friction and collision, achieving the effects of vibration reduction and noise reduction.

DETAILED DESCRIPTION OF THE PREFERRED EMBODIMENTS

Since various aspects and embodiments are only illustrative and non-limiting, after reading this specification, those with ordinary knowledge may have other aspects and embodiments without departing from the scope of the present disclosure. According to the following detailed description and patent application scope, the features and advantages of these embodiments will be more prominent.

In present disclosure, "a" or "an" is used to describe the units, elements, and components described herein. This is done for convenience of description only and providing a general meaning to the scope of the present disclosure. Therefore, unless clearly stated otherwise, the description should be understood to include one, at least one, and the singular can also include plural.

In this specification, the terms "first" or "second" and other similar ordinal numbers are mainly used to distinguish or refer to the same or similar elements or structures, and do not necessarily imply that these elements or structures are in space or chronological order. It should be understood that in certain situations or configurations, ordinal numbers can be used interchangeably without affecting the implementation of this creation.

In this disclosure, the terms "including", "having", "containing" or any other similar terms are intended to encompass non-exclusive inclusive. For example, a component, structure, article, or device that contains a plurality element is not limited to such elements as listed herein but may include those not specifically listed but which are typically inherent to the component, structure, article, or device. In addition, the term "or" means an inclusive "or" rather than an exclusive "or" unless clearly stated to the contrary.

The dynamic balancing apparatus of the present disclosure is applied to a device having a rotor, such as an electric motor, but not limited to the aforesaid device. The aforesaid rotor is a rotor with eccentric mass, the two sides thereof being connected to a rotating shaft extending along an axis. By means of the dynamic balancing apparatus of the present disclosure, an inertial force and moment of inertia generated due to eccentric mass of the rotating rotor can be offset to achieve dynamic balance.

Figure 1:
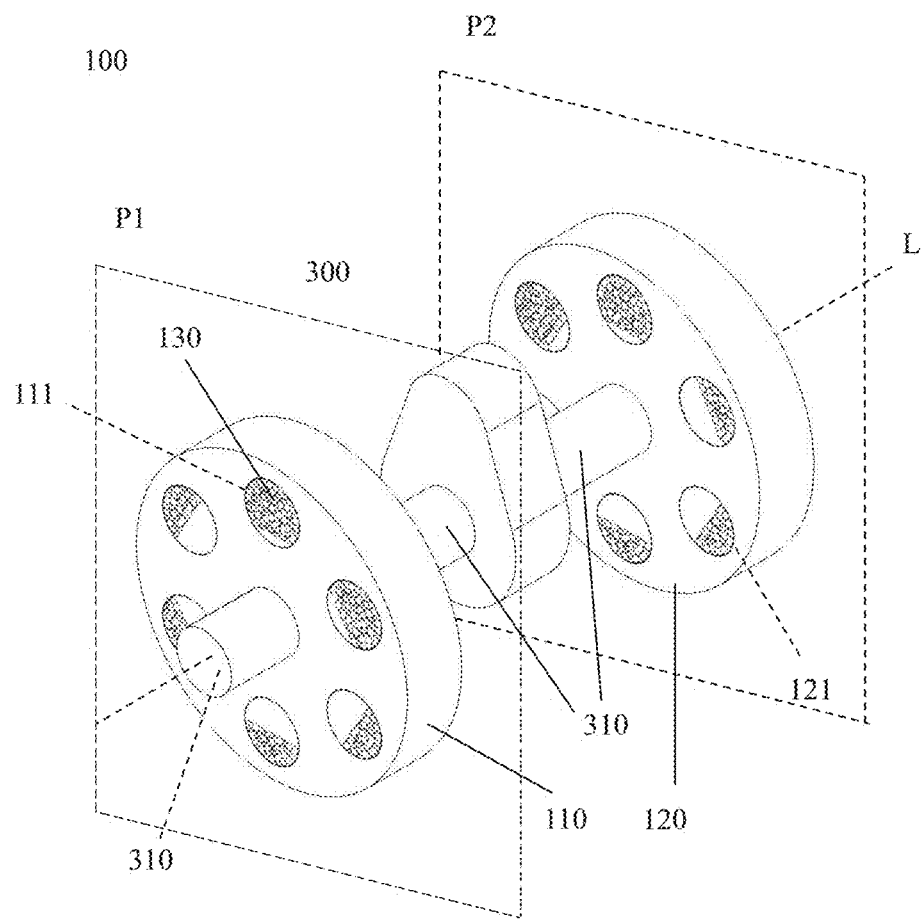
FIG. 1 is a schematic diagram of the dynamic balancing apparatus of the present disclosure in combination with a rotating rotor while rotating.

Please refer to FIG. 1 which is a schematic diagram of the dynamic balancing apparatus of the present disclosure in combination with a rotating rotor while rotating. As shown in FIG. 1, the dynamic balancing apparatus 100 of the present disclosure includes a dynamic balancing assembly and a plurality of damping particles 130. The dynamic balancing assembly includes at least two structural members, wherein each structural member may be disposed respectively as an independent item, or the at least two structural members may be disposed as being interconnected by a connecting element to form an integrated component (but the adjacent two structural members are kept at a distance despite being connected by a connecting element), according to design needs to change different arrangements. For the convenient illustration of the technical characteristics of the present disclosure, in the following embodiments, the aforesaid at least two structural members only include an independent first structural member 110 and an independent second structural member 120, but the number of the aforesaid structural members may be adjusted per different designs without being limited to the present embodiment. Moreover, in the following embodiments, the first structural member 110 and the second structural member 120 are separately disposed at the rotating shaft 310 connecting the two sides of the rotor 300, and the rotor 300 is situated between the first structural member 110 and the second structural member 120, but the location of the aforesaid structural members may be changed per different designs, for example, the first structural member 110 and the second structural member 120 may be concurrently disposed at the rotating shaft 310 connecting to either side of the rotor 300 without limitation of the present embodiment.

The rotating 310 extends linearly along the axis L. The axis L herein is defined as a balance axis corresponding to the dynamic balancing apparatus 100 of the present disclosure, the rotor 300 and the rotating shaft 310 in the stationary state, enabling the dynamic balancing apparatus 100, the rotor 300 and the rotating shaft 310 to maintain static balance. When the rotating shaft 310 rotates about the axis L, the first structural member 110 and the second structural member 120 will rotate with the rotor 300 about the axis L. Theoretically, due to the potential deviation of mass of the rotor 300 and the rotating 310, as the rotor 300 and the rotating 310 begin to rotate, the rotor 300 and the rotating shaft 310 will rotate about another dynamic axis other than the aforesaid axis L, thereby causing rotating imbalance. By disposing the dynamic balancing apparatus 100 of the present disclosure, the potential deviation of mass of the rotor 300 and the rotating 310 is offset, causing the aforesaid dynamic axis which the rotor 300 and the rotating shaft 310 rotate about to approach the axis L as mush as possible or even overlap with the axis L, achieving the effects of dynamic balance improvement. Accordingly, in the following embodiments, by disposing the dynamic balancing apparatus 100 of the present disclosure in combination with the rotor 300, the axis L in FIG. 1 can be deemed to approach the dynamic axis of the rotor 300 or overlap with the dynamic axis.

In an embodiment of the present disclosure, the first structural member 110 and the second structural member 120 adopt the same structural design. As shown in FIG. 1, the first structural member 110 is of a disc-shape like structure, and the axis L passes through a central part of the first structural member 110 (a perforation for penetration by the rotating shaft 310 may be disposed on the first structural member 110), causing the first structural member 110 to be entirely symmetrical in structure about the axis L. The first structural member 110 disposed at the rotating shaft 310 corresponds to an independent plane P1 substantially perpendicular to the axis L, namely, the first structural member 110 is located approximately on the independent plane P1. Similarly, the second structural member 120 is of a disc-shape like structure, and the axis L passes through a central part of the second structural member (a perforation for penetration by the rotating shaft 310 may be disposed on the second structural member 120), causing the second structural member 120 to be entirely symmetrical in structure about the axis L. The second structural member 120 disposed at the rotating shaft 310 corresponds to an independent plane P2 substantially perpendicular to the axis L, namely, the second structural member 120 is located approximately on the independent plane P2. In design, the independent plane P1 corresponding to the first structural member 110 is substantially parallel to the independent plane P2 corresponding to the second structural member 120; and when the number of the structural members is two or more, the independent planes corresponding to any two of the structural members are also parallel to each other.

In this embodiment, although the outlines of the first structural member 110 and the second structural member 120 are circular, the present disclosure is not limited thereto, the outlines of first structural member 110 and the second structural member 120 may also be polygonal or take on other corresponding designs capable of structural symmetry about the axis L. However, based on different design requirements, the first structural member 110 and the second structural member 120 may also adopt structurally asymmetrical shape design about the axis L, such as a sector, hammer or other irregular shapes. Furthermore, the structural dimensions of the first structural member 110 and the second structural member 120 may also be changed based on diffident needs.

The first structural member 110 and the second structural member 120 may be made of a rigid material which is not easily deformed, such as metal, wood, stone, plastic material or any other material having similar characteristics, but the present disclosure is not limited thereto.

The first structural member 110 includes at least a first recess portion 111, and the second structural member 120 includes at least a second recess portion 121. In an embodiment of the present disclosure, the at least one recess portion 111 of the first structural member 110 is plural. The first recess portions 111 are symmetrically arranged in structure about the axis L, and the first recess portions 111 have the same dimension. Similarly, the at least one recess portion 121 of the second structural member 120 is plural. The second recess portions 121 are symmetrically arranged in structure about the axis L, and the second recess portions 121 have the same dimension, but the present disclosure is not limited thereto. For example, based on different design requirements, only a single recess portion may be disposed on each structural member; as another example, according to different design requirements, when multiple recess portions may be disposed on each structural member, where the multiple recess portions may be asymmetrically arranged in structure about the axis and/or having different dimensions concurrently.

In an embodiment of the present disclosure, each first recess portion 111 may be a perforation by penetrating from the surface of one side to the surface of the other side of the first structural member 110, or a blind hole caved in from the surface of one side of the first structural member 110 towards the other side. In response to different designs of the aforesaid blind hole or perforation, each first recess portion 111 may couple with one or more covers for sealing the opening of the blind hole or perforation. Similarly, each second recess portion 121 may be a blind hole caved in from the surface of one side of the second structural member 120 towards the other side, or a perforation by penetrating from the surface of one side to the surface of the other side of the second structural member 120. In response to different designs of the aforesaid blind hole or perforation, each second recess portion 121 may couple with one or more covers for sealing the opening of the blind hole or perforation. In this embodiment, each first recess portion 111 and each second recess portion 121 adopt a round hole structure, but the present disclosure is not limited thereto, for example, each first recess portion 111 and each second recess portion 121 may also adopt other polygonal or arbitrary shaped hole or groove structure.

Moreover, as described above, the structural dimensions of the first structural member 110 and the second structural member 120 may be changed depending on needs, and the diameters of the first structural member 110 and the second structural member 120 of the present embodiment may be reduced to that of the rotating shaft 310. A portion of the rotating shaft 310 may even directly be adopted as the first structural member 110 and the second structural member 120. In such case, each first recess portion 111 and each second recess portion 121 may be a hole or groove structure caved in from the surface of the rotating shaft 310 towards the axis L.

In an embodiment of the present disclosure, each first recess portion 111 or second recess portion 121 may further be divided into a plurality of secondary recess portions by means of a divider (such as a partition plate) to meet different usage needs. Through the disposition of a divider, the contact area inside each recess portion is increased, thereby making it easier for the plurality of damping particles 130 to contact-deform and collide with the divider or the wall surface of the recess portion. Accordingly, the efficacy of consumption of vibrating energy conveyed from the rotor may be enhanced by the plurality of the damping particles.

The plurality of damping particles 130 are used for being introduced into the at least one first recess portion 111 of the first structural member 110 and the at least one second recess portion 121 of the second structural member 120. By controlling the total mass and location (i.e. choice among different recess portions) of the plurality of introduced damping particles 130, the location of the centroid of the first structural member 110 and second structural member 120 can be respectively adjusted. Taking the first structural member 110 as an example, as described above, in this embodiment, due to the structural symmetry of the first structural member 110 about the axis L, and the plurality of first recess portions 111 of the first structural member 110 being symmetrically arranged in structure about the axis L, the location of the centroid of the first structural member 110 is kept approximately on the axis L. Accordingly, by selectively introducing the plurality of the damping particles 130 into at least one of the plurality of the first recess portions of the first structural member 110, the centroid of the first structural member 110 will deviate from the axis L.

As the purpose of introducing with the plurality of damping particles 130 is to make the centroid of the first structural member 110 deviate from the axis L, pursuant to different needs, one can choose between introducing the plurality of damping particles 130 into only one single first recess portion 111 and introducing the plurality of damping particles 130 of not entirely same total mass into multiple first recess portions 111 respectively. To further illustrate, when the first recess portion 111 introduced with the plurality of damping particles 130 of the first structural member 110 is plural, the first recess portions 111 introduced with the plurality of damping particles 130 do not all have the plurality of damping particles 130 of the same total mass (i.e., the first recess portions 111 introduced with the plurality of damping particles 130 at least include the plurality of damping particles 130 of two or more total masses). Through the differentiation of mass distribution of the plurality of damping particles 130 generated in the first recess portions 111, the centroid of the first structural member 110 is prevented from staying on the axis L. Likewise, the same method is adopted on the second structural member 120 to cause the centroid of the second structural member 120 to deviate from the axis L.

In this embodiment, the plurality of damping particles 130 do not completely fill up the recess portion, namely, some space is reserved in the recess portion after being introduced with the plurality of damping particles 130, so as to allow the plurality of damping particles 130 to move freely in the recess portion with the rotation of the rotor 300, causing friction and collision among the plurality of damping particles 130. However, according to different design requirements, the plurality of damping particles 130 may also fill up the recess portion entirely, enabling the plurality of damping particles 130 to collide, friction or squeeze-deform in the recess portion with the rotation of the rotor 300.

In an embodiment of the present disclosure, the damping particle 130 can be made of rigid material such as metal, plastic material or other materials having similar characteristics. In order to increase the friction and collision area among the plurality of damping particles 130, the damping particle 130 may also be made of deformable elastic material such as rubber, silicon material or other materials having similar characteristics. In addition, in response to different usage needs, the damping particle 130 may be selectively of solid particle structure or hollow particle structure. In an embodiment of the present disclosure, the plurality of damping particles 130 may concurrently have different sizes and/or shapes, but the present disclosure is not limited thereto, for example, the plurality of damping particles 130 may also be composed of particles of same size and/or shape.

Applications of the dynamic balancing apparatus 1 of the present disclosure are illustrated through the embodiment in FIG. 1 hereinafter. Firstly, for device having a rotor 300, the location of the centroid of the rotor 300 can be calculated or measured by hardware or software utilized by relevant measuring apparatus or other devices, so as to determine whether the rotor 300 has centroid deviation. The aforesaid centroid deviation takes into account not only the rotor 300 itself, but also the total centroid deviation caused by further integrating the rotating shaft 310 connected to the rotor 300, the shaft joint used for supporting or positioning the rotating shaft 310 and other accessories. If there exists centroid deviation, then the inertial force and moment of inertia generated due to centroid deviation as the rotor 300 rotates is calculated or simulated. According to numerical values related to aforesaid inertial force and moment of inertia, locations where the first structural member 110 and the second structural member 120 of the dynamic balancing apparatus 1 of the present disclosure are respectively disposed on the rotating shaft 310 connected to the rotor 300 are further calculated, for the ease of actual installation of the first structural member 110 and the second structural member 120 on the rotating shaft 310 (for example in this embodiment, the first structural member 110 is disposed between the rotor 300 and the shaft joint at one end of the rotating shaft 310, while the second structural member 120 is disposed between the rotor 300 and the shaft joint at the other end of the rotating shaft 310, but disposition location of each structural member is not limited by this embodiment).

Next, with the numerical vales related to the aforesaid inertial force and moment of inertia, the expected inertial force and moment of inertia generated respectively corresponding to the first structural member 110 and the second structural member 120 of the dynamic balancing apparatus 1 of the present disclosure are further calculated, so as to deduce numerical values regarding displacement of centroid deviation from the axis L and required mass of the first structural member 110 and the second structural member 120. Taking the first structural member 110 as an example, according to the aforesaid numerical values regarding displacement of centroid deviation from the axis L and required mass of the first structural member 110, one or multiple first recess portions 111 corresponding to the location of the first structural member 110 are respectively introduced with a plurality of damping particles 130 of corresponding masses. By adjusting the numerical values of the required mass of the first structural member 110 with the mass of the introduced plurality of damping particles 130, the centroid of the first structural member 110 is moved to the required location of deviation. Likewise, the same method is also adopted to adjust the numerical values of the required mass of the second structural member 120, and the centroid of the second structural member 120 is moved to the required location of deviation. Noteworthily, when installing each structural member on the rotating shaft, corresponding fixing parts or positioning parts (such as C-shaped retaining ring) may be needed to securely combine the structural member onto the rotating shaft, so when calculating the inertial force and moment of inertia generated corresponding to each structural member, the effects on centroid deviation of each structural member by the fixing parts or positioning parts shall also be taken into consideration, so as to further obtain more precise numerical values of location of centroid deviation and required mass for each structural member.

Accordingly, the dynamic balancing apparatus 1 of the present disclosure is set up for device having a rotor 300 with centroid deviation. As the rotor 300 rotates, the first structural member 110 and the second structural member 120 rotate simultaneously with the rotor 300, and the inertial force and moment of inertia generated from the design of centroid deviation of the structural member are used for offsetting the inertial force and moment of the inertia generated from centroid deviation of the rotor 300 as the rotor 300 rotates, thereby achieving dynamic balance of the rotor 300 while rotating. Moreover, when the first structural member 110 and the second structural member 120 rotate with the rotor 300, the plurality of damping particles 130 introduced into the first recess portion 111 and the second recess portion 121 will congregately move toward regions away from the axis L in each recess portion due to the centrifugal force generated by rotation (as shown by the location and status of the plurality of damping particles 130 in FIG. 1 or FIG. 2), causing friction and collision among the plurality of damping particles 130, and thereby consuming the vibration energy and noise generation of the rotor 300 while rotating to achieve the effects of vibration reduction and noise reduction.

Figure 2:
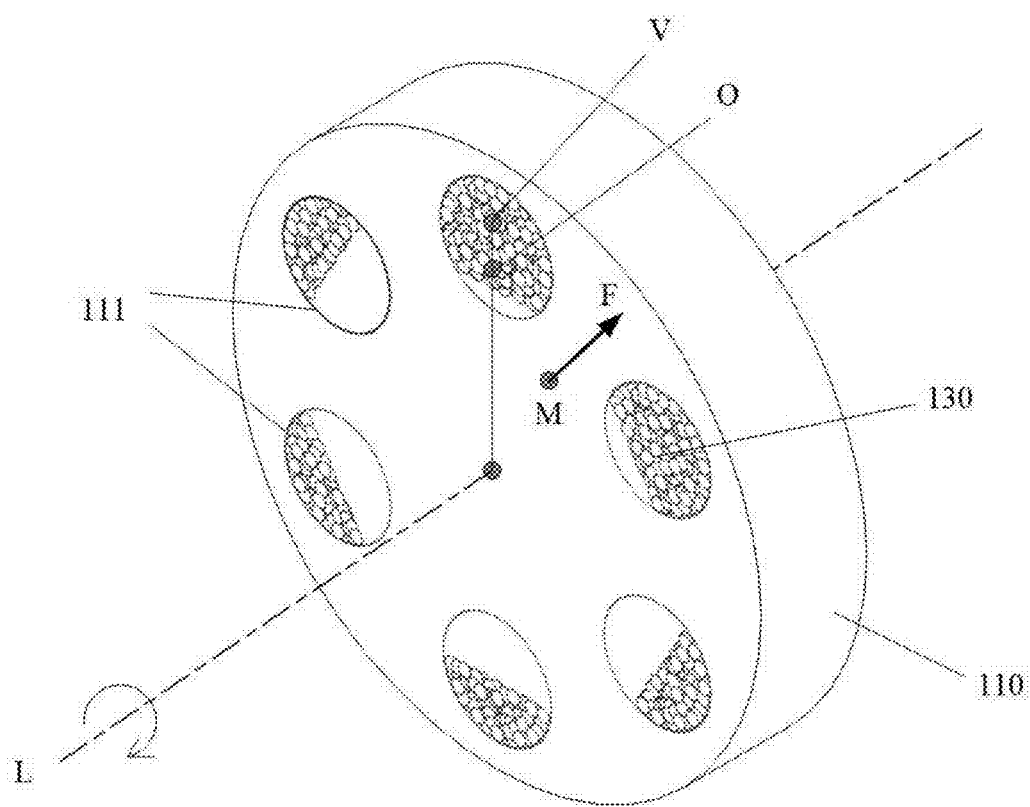
FIG. 2 is a schematic diagram of a first structural member of the dynamic balancing apparatus of the present disclosure generating an inertial force while rotating.

The first structural member 110 in FIG. 1 is used to illustrate the principles of inertial force generated by centroid deviation hereinafter. Please refer to FIG. 2 which is a schematic diagram of a first structural member of the dynamic balancing apparatus of the present disclosure generating an inertial force while rotating. As shown in FIG. 2, in this embodiment, the first structural member 110 includes a total of six first recess portions 111, wherein the first recess portions 111 are circularly and symmetrically arranged in structure about the axis L passing through the central part of the first structural member 110. Pursuant to the calculated inertial force and moment of inertia generated corresponding to the first structural member 110, the first recess portions 111 are respectively introduced with a plurality of damping particles 130, and the first recess portions 111 introduced with the plurality of damping particles 130 do not all have the plurality of damping particles 130 of the same total mass (as shown in FIG. 2, the first recess portions 111 include plural damping particles 130 of two different total masse). Accordingly, the total mass of the plurality of damping particles 130 introduced in each first recess portion 111 is not the same, hence forming a differentiated mass distribution to achieve the effects of centroid deviation of the structural member.

As shown in FIG. 2, in this embodiment, as the first structural member 110 rotates with the rotor, each first recess portion 111 introduced with a plurality of damping particles 130 will generate inertial force via the plurality of damping particle 130. The inertial force herein is equal to the product of the total mass of the plurality of damping particles 130 introduced into the first recess portion 111, the square of the angular velocity of the rotating rotor, and the shortest distance from the axis L to the location of volume centroid V of the plurality of damping particles 130 introduced into the recess portion. The aforesaid location of volume centroid V shall be referred to as the location reflected by the volume of the congregated plurality of damping particles 130 which move towards regions away from the axis L in the first recess portion 111 due to a centrifugal force generated by rotation of the first structural member 110 with the rotor while rotating. Since the plurality of damping particles 130 do not fill up the first recess portion 111 completely, the shortest distance from the location of volume centroid V of the plurality of damping particles 130 to the axis L will surely be larger than the shortest distance from the central location O of the first recess portion 111 to the axis L. In light of the above, inertial force generated by each first recess portion 111 introduced with the plurality of damping particles 130 can be respectively calculated.

It is known that the inertial force F generated by the first structural member 110 is equal to the sum of inertial forces generated by all first recess portions 111 introduced with the plurality of damping particles 130 of the first structural member 110. Therefore, after inertial force generated by each first recess portion 111 introduced with plural damping particles 130 is respectively calculated, grand total can be calculated via mathematical vector formula to arrive at an inertial force F generated by the first structural member 110 at its centroid M. Accordingly, by introducing plural damping particles 130 of different masses into different first recess portions 111, the location of the centroid M of and the magnitude of the inertial force F generated by the first structural member 110 can changed to achieve the effects of desired dynamic balance. Likewise, the second structural member 120 may also be adjusted correspondingly using the same method.

Figure 3:
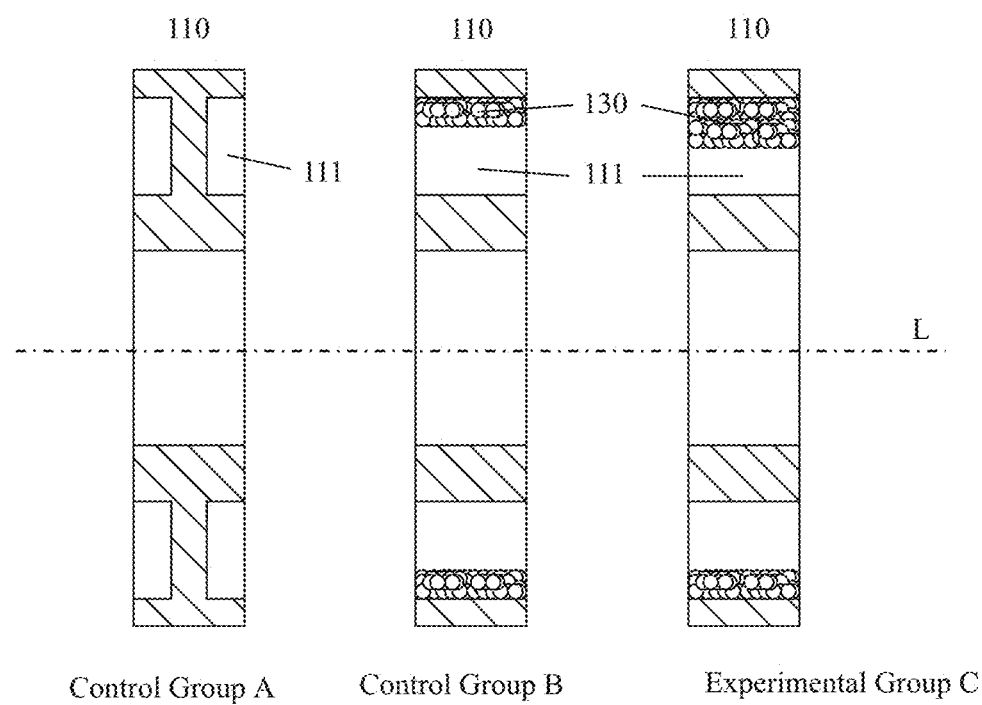
FIG. 3 is a sectional view of the respective structural member of experimental group C and control groups A and B employed in the dynamic balancing apparatus of the present disclosure.
Figure 4:
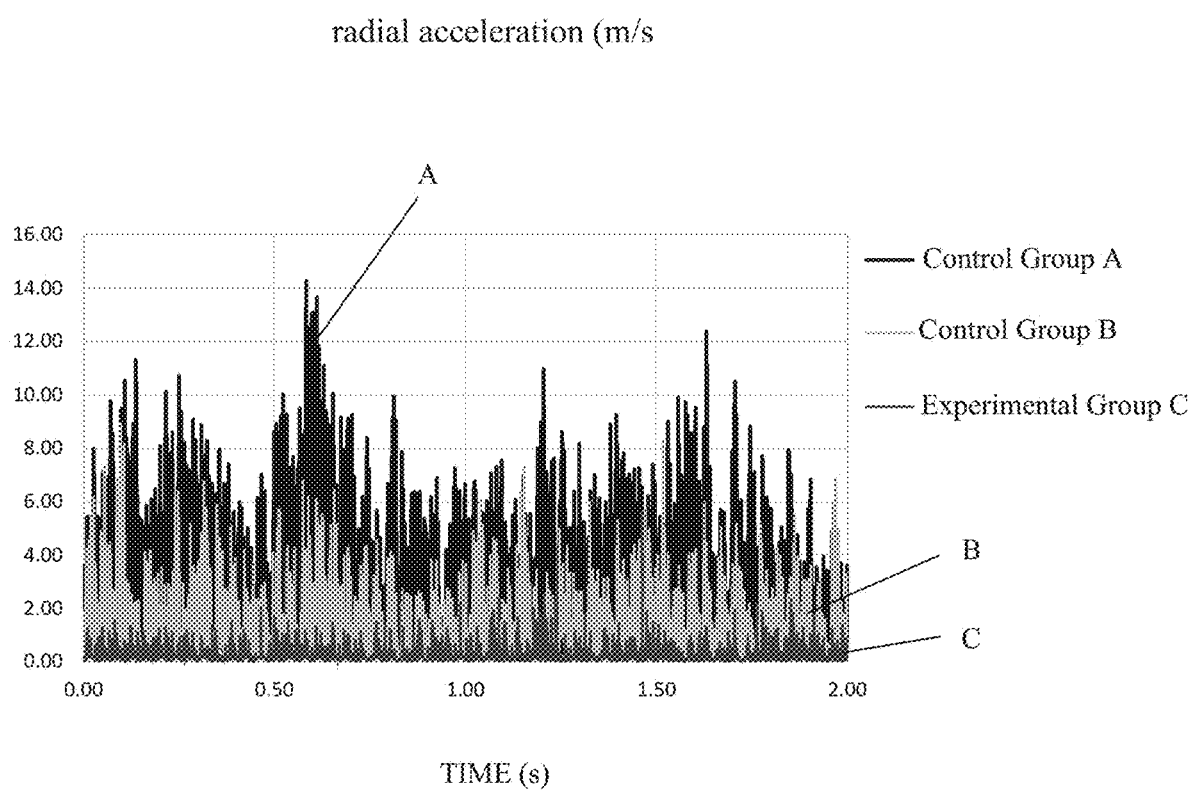
FIG. 4 is a comparison chart of results of radial acceleration of the centroid of the rotor of experimental group C and control groups A and B of the dynamic balancing apparatus of the present disclosure.
Figure 5:
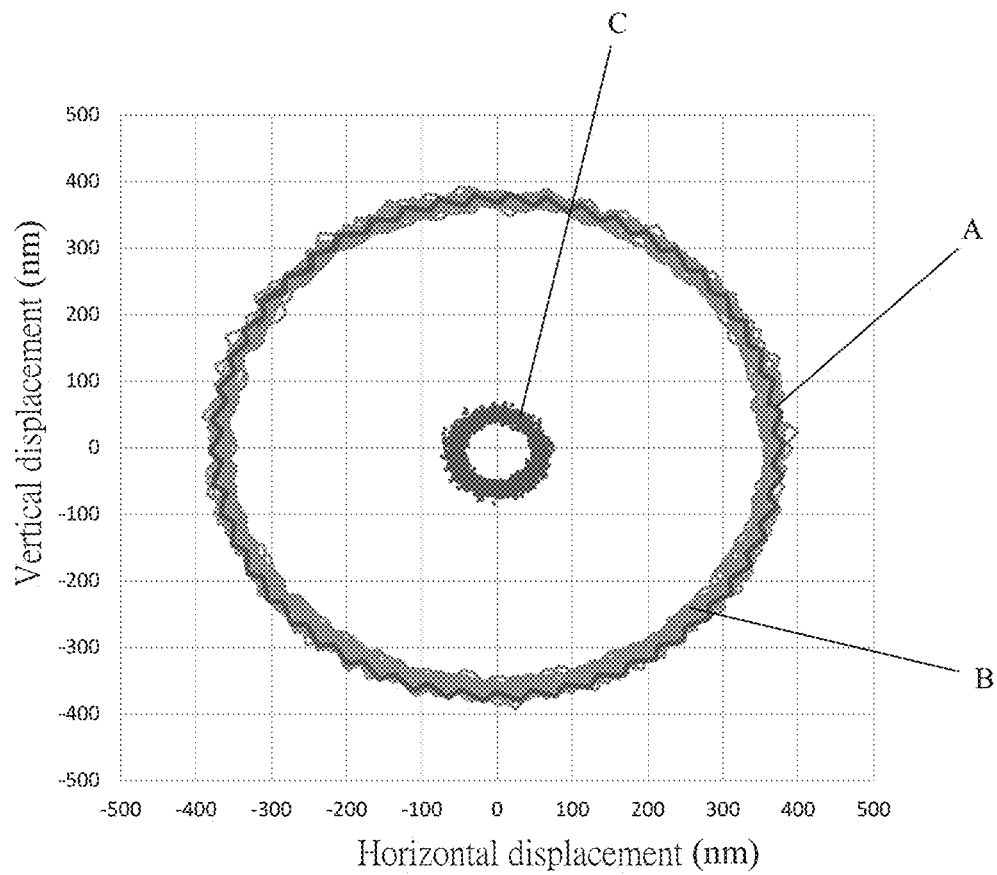
FIG. 5 is a comparison chart of radial displacement trajectory of the centroid of the rotor of experimental group C and control groups A and B of the dynamic balancing apparatus of the present disclosure.

Please refer to FIG. 1, FIG. 3 to FIG. 5 altogether hereinafter, wherein FIG. 3 is a sectional view of the respective structural member of Experimental Group C and Control Groups A and B employed in the dynamic balancing apparatus of the present disclosure; FIG. 4 is a comparison chart of results of radial acceleration of the centroid of the rotor of Experimental Group C and Control Groups A and B of the dynamic balancing apparatus of the present disclosure; FIG. 5 is a comparison chart of radial displacement trajectory of the centroid of the rotor of Experimental group C and Control Groups A and B of the dynamic balancing apparatus of the present disclosure. In an experiment below, the rotor 300 with eccentric mass shown in FIG. 1 is adopted to combine with the first structural member 110 and second structural member 120 of the dynamic balancing apparatus of the present disclosure as a basic device, and introducing of plural damping particles 130 is adopted as a variable. As shown in FIG. 1 and FIG. 3 (wherein only the first structural member 110 is presented as an example in FIG. 3, but the second structural member 120 also adopts the same design), The Control Group A has a condition that all first recess portions 111 of the first structural member 110 and all second recess portions 121 of the second structural member 120 are not introduced with any damping particles 130, and the Control Group B has a condition that all first recess portions 111 of the first structural member 110 and all second recess portions 121 of the second structural member are introduced with plural damping particles 130 of same total mass, whereas the Experimental Group C has a condition that all first recess portions 111 of the first structural member 110 and all second recess portions 121 of the second structural member 120 are introduced with plural damping particles 130 of not-all-the-same total masses; and numerical values for radial acceleration and displacement of the centroid of the rotor as the rotor rotates is simulated and measured.

As shown in FIG. 4, it can been seen after experimental data is tallied, the radial acceleration of the centroid of the rotor in Control Group A is between approximately 2 and 14.5 m/s$^2$, and change in value is enormous and unstable; the radial acceleration of the centroid of the rotor in Control Group B is between approximately 1 and 8.5 m/s$^2$, and change in value is still quite large and unstable; whereas the radial acceleration of the centroid of the rotor in Experimental Group C roughly maintains below 3 m/s$^2$. In light of the above, introducing the plurality of damping particles 130 of different total masses in the recess portions of each structural member causes centroid deviation of each structural member to offset the inertial force and moment of inertia generated by the rotor due to centroid deviation of the rotor, conspicuously and effectively decreasing the numerical values for radial acceleration of the centroid of the rotor, thereby effectively maintaining dynamic balance of the rotor while rotating.

Also shown in FIG. 5, it can been seen after experimental data is tallied, the radial displacement of the centroid of the rotor in Control Group A and Control Group B is between approximately 350 and 400 nm, while the radial displacement of the centroid of the rotor in Experimental Group C is between approximately 40 and 80 nm. In light of the above, introducing the plurality of damping particles 130 of different total masses in the recess portions of each structural member causes centroid deviation of each structural member to offset the inertial force and moment of inertia generated by the rotor due to centroid deviation of the rotor, conspicuously and effectively decreasing the numerical values for radial displacement of the centroid of the rotor, thereby effectively maintaining dynamic balance of the rotor while rotating.

Figure 6:
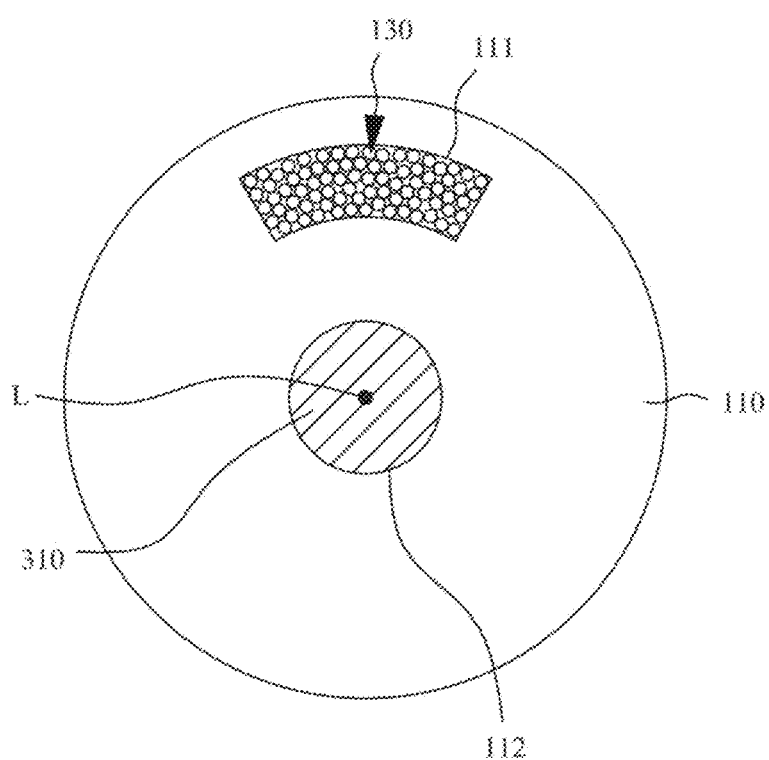
FIG. 6 is a schematic diagram of a first structural member of the dynamic balancing apparatus according to another embodiment of the present disclosure.

Please refer to FIG. 6 which is a schematic diagram of a first structural member of the dynamic balancing apparatus according to another embodiment of the present disclosure. As shown in FIG. 6, in this embodiment, the first structural member 110 is entirely symmetrical in structure about the axis L of the rotating shaft 310. The first structural member 110 only includes a single first recess portion 111, and the shape of the first recess portion 111 is a partial section of an annular space formed based on the perforation 112 as the center of circle; that is to say, one side of the first recess portion 111 closet to the perforation 112 and another side farthest from the perforation 112 both form arc-shaped sides with perforation 112 as the center of circle. When the plurality of damping particles 130 are introduced into the first recess portion 111 until the location of centroid deviation and the total mass of the first structural member 110 reach the predetermined requirement, the shape of the first recess portion 111 can better follow the rotation path of the rotor and provide the plurality of damping particles 130 with larger collision area, so as to achieve better effects of vibration reduction and noise reduction. Certainly, depending on different design requirements, the first structural member 110 in this embodiment may also have plural first recess portions 111 disposed therein, and the location of disposition of each first recess portion 111 may be arbitrarily modified, for example, the shortest distance to the perforation 112 from different first recess portions 111 may be different.

Figure 7:
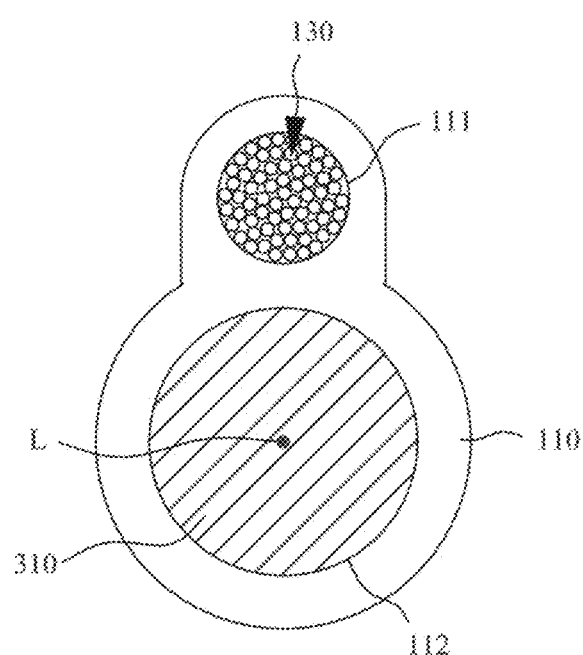
FIG. 7 is a schematic diagram of a first structural member of the dynamic balancing apparatus according to yet another embodiment of the present disclosure.

Please refer to FIG. 7 which is a schematic diagram of a first structural member of the dynamic balancing apparatus according to yet another embodiment of the present disclosure. As in FIG. 7, in this embodiment, the first structural member 110 is not entirely symmetrical in structure about the axis L of the rotating shaft 310. The first structural member 110 has a perforation 112 for penetration by the rotating shaft 310 for convenient disposition on the rotating shaft 310. The first structural member 110 only includes a single first recess portion 111, and the first recess portion 111 and the main structure of the first structural member 110 are disposed collectively on another side other than the perforation 112, causing the outline of the first structural member 110 to form a ring-like structure. Herein, the first recess portion 111 adopts a round hole structure. Accordingly, when the plurality of damping particles 130 are introduced into the first recess portion 111 until the location of centroid deviation and the total mass of the first structural member 110 reach the predetermined requirement, the first structural member 110 can act as simple add-on structural member to be installed on a predetermined location of the rotating shaft 310, better suiting various devices having a rotor.

Moreover, the dynamic balancing apparatus of the present disclosure further has advantages such as easy to manufacture and assemble, small volume, minimal change to the original structure, low cost, etc.

In summary, the dynamic balancing apparatus of the present disclosure can, pursuant to the status of centroid deviation of a rotor, and by means of introducing multiple damping particles of required mass into one or more recess portions corresponding to each structural member, cause centroid deviation on each structural member to achieve dynamic balancing while the rotor rotates. Moreover, reduction of vibration and noise can be achieved by the friction and collision induced from the movement of the plurality of the damping particles as the rotor rotates.

The present disclosure has disclosed with preferred embodiments in the foregoing paragraphs, and it should be understood by those skilled professionals in the operations that the present disclosure is only intended to depict the disclosure and should not be limited to the scope of the present disclosure. It should be noted that variations and permutations equivalent to those of the embodiments are intended to be fallen into the scope of the present disclosure. Therefore, the scope of protection of the present disclosure is subject to the definition of the scope of patent application.

What is claimed is:

1. A dynamic balancing apparatus applicable to a device having a rotor, where two ends of the rotor are connected via a rotating shaft extending along an axis, the dynamic balancing apparatus comprising:
a dynamic balancing assembly including at least two structural members being separately arranged on the rotating shaft so as to rotate simultaneously with the rotor, each structural member corresponding to an independent plane perpendicular to the axis of the rotating shaft, wherein each of the structural members includes at least one recess portion; and
a plurality of damping particles introduced into the at least one recess portion of each of the structural members, causing a centroid of each of the structural members to deviate from the axis;
accordingly, each of the structural members generates an inertial force and moment of inertia as rotation of the rotor to offset another inertial force and moment of inertia generated by centroid deviation of the rotor while rotating to achieve dynamic balance, wherein the inertial force generated by any of the structural members is equal to a total inertial force generated by the at least one recess portion introduced with the plurality of damping particles of one of the structural members, and wherein the plurality of damping particles can move in the at least one recess portion as rotation of the rotor to induce friction and collision so as to achieve the effects of vibration reduction and noise reduction.

2. The dynamic balancing apparatus according to claim 1, wherein when the at least one recess portion of one of the at least two structural members is plural, the recess portions are arranged symmetrically in structure about the axis.

3. The dynamic balancing apparatus according to claim 2, wherein the plurality of damping particles are introduced into at least one of the recess portions of the one structural member.

4. The dynamic balancing apparatus according to claim 3, wherein when the at least one recess portion of the one structural member introduced with the plurality of damping particles is plural, the total mass of the plurality of damping particles in the recess portions are not all the same.

5. The dynamic balancing apparatus according to claim 1, wherein each particle of the plurality of damping particles is made of plastic material.

6. The dynamic balancing apparatus according to claim 1, wherein each particle of the plurality of damping particles has a hollow structure.

7. The dynamic balancing apparatus according to claim 1, wherein the plurality of damping particles may simultaneously have various sizes or shapes.

8. The dynamic balancing apparatus according to claim 1, wherein the inertial force generated by the at least one recess portion is equal to the product of the total mass of the plurality of damping particles introduced into the at least one recess portion, the square of the angular velocity of the rotating rotor, and the shortest distance from the axis to the location of the centroid of volume of the plurality of damping particles introduced into the recess portion when the one structural member rotates with the rotor.

9. The dynamic balancing apparatus according to claim 1, wherein the independent plane corresponding to any of the structural members is substantially parallel to the independent plane corresponding to another of the structural members.

10. A method applicable to a device having a rotor for maintaining dynamic balance and reducing vibration, the method includes the following steps:
- calculating an inertial force and moment of inertia generated due to centroid deviation of the rotor while rotating;
- separately disposing at least two structural members on a rotating shaft connected to the rotor, wherein each of the at least two structural members correspond to an independent plane perpendicular to an axis of the rotating shaft, and each of the at least two structural members includes at least one recess portion; and
- introducing a plurality of damping particles into the at least one recess portion of each of the at least two structural members so as to cause a centroid of each of the at least two structural members to deviate from the axis;
- accordingly, each of the at least two structural members generates inertial force and moment of inertia with the rotation of the rotor to offset the inertial force and the moment of inertia generated from the centroid deviation of the rotor while rotating to achieve dynamic balancing, wherein the inertial force generated by any of the structural members is equal to a total inertial force generated by the at least one recess portion introduced with the plurality of damping particles of one of the structural members, and wherein the plurality of damping particles can move within the at least one recess portion while the rotor rotates to induce friction and collision, achieving the effects of vibration reduction and noise reduction.

* * * * *